United States Patent
Yang et al.

(10) Patent No.: US 8,032,657 B2
(45) Date of Patent: Oct. 4, 2011

(54) PRESERVATION OF TYPE INFORMATION BETWEEN A CLIENT AND A SERVER

(75) Inventors: Ting-hao Yang, Kirkland, WA (US);
David Ebbo, Redmond, WA (US);
Nikhil Kothari, Sammamish, WA (US);
Shanku Shivabrata Niyogi, Bellevue, WA (US); Jonathan Hawkins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 904 days.

(21) Appl. No.: 11/319,285

(22) Filed: Dec. 27, 2005

(65) Prior Publication Data

US 2007/0078946 A1     Apr. 5, 2007

Related U.S. Application Data

(60) Provisional application No. 60/716,367, filed on Sep. 12, 2005.

(51) Int. Cl.
G06F 15/16 (2006.01)
G06F 9/44 (2006.01)

(52) U.S. Cl. ......... 709/246; 709/203; 717/100; 717/108

(58) Field of Classification Search ................... 709/217
See application file for complete search history.

(56) References Cited

U.S. PATENT DOCUMENTS

| | | | |
|---|---|---|---|
| 5,187,790 A * | 2/1993 | East et al. ............ | 719/316 |
| 5,991,802 A | 11/1999 | Allard et al. | |
| 6,029,246 A | 2/2000 | Bahr | |
| H1853 H | 6/2000 | Wilkiewicz | |
| 6,263,498 B1 | 7/2001 | Alcorn et al. | |
| 6,332,210 B1 | 12/2001 | Barkataki et al. | |
| 6,393,497 B1 | 5/2002 | Arnold | |
| 6,438,559 B1 | 8/2002 | White | |
| 6,446,137 B1 | 9/2002 | Vasudevan et al. | |
| 6,487,607 B1 | 11/2002 | Wollrath | |
| 6,615,253 B1 | 9/2003 | Bowman-Amuah | |
| 6,629,128 B1 * | 9/2003 | Glass .................. | 709/203 |
| 6,848,108 B1 * | 1/2005 | Caron .................. | 719/315 |
| 6,928,488 B1 * | 8/2005 | de Jong et al. ......... | 709/246 |
| 6,968,355 B2 * | 11/2005 | Baldwin et al. ........ | 709/201 |
| 7,203,947 B2 * | 4/2007 | Claar .................. | 719/330 |
| 2002/0112056 A1 * | 8/2002 | Baldwin et al. ........ | 709/225 |

(Continued)

FOREIGN PATENT DOCUMENTS

WO    WO 98/44414    10/1998

(Continued)

OTHER PUBLICATIONS

Oracle, "Oracle Application Server Web Services Developers Guide", 2004, Oracle, "Building Clients that Use Web Services".*

(Continued)

Primary Examiner — Dohm Chankong
Assistant Examiner — Yanet Rodriguez
(74) Attorney, Agent, or Firm — Workman Nydegger (57) ABSTRACT

In a distributed computing system containing multiple entities such as servers and clients, an object passed between the entities is attached with metadata identifying the type of the object and/or types and values of properties associated with the object. Before the object is passed to an entity in the distributed computing system, the object may be serialized into a data format that the receiving entity can understand.

20 Claims, 8 Drawing Sheets

U.S. PATENT DOCUMENTS

| | | | |
|---|---|---|---|
| 2003/0105833 A1* | 6/2003 | Daniels et al. ............... 709/219 |
| 2003/0167355 A1* | 9/2003 | Smith et al. .................. 709/328 |
| 2003/0191803 A1* | 10/2003 | Chinnici et al. ............. 709/203 |
| 2004/0111642 A1 | 6/2004 | Peles |
| 2004/0243703 A1 | 12/2004 | Demmer et al. |
| 2004/0249814 A1 | 12/2004 | Navarre et al. |
| 2004/0260821 A1 | 12/2004 | Yamamoto et al. |
| 2004/0261008 A1* | 12/2004 | Pepin et al. .................. 715/500 |
| 2005/0033854 A1 | 2/2005 | Knitter |
| 2005/0033988 A1 | 2/2005 | Chandrashekhar et al. |
| 2005/0039054 A1 | 2/2005 | Satoh et al. |
| 2005/0108627 A1* | 5/2005 | Mireku ........................ 715/513 |
| 2005/0155044 A1 | 7/2005 | Broussard |
| 2009/0055930 A1* | 2/2009 | Peles .............................. 726/23 |

FOREIGN PATENT DOCUMENTS

WO    WO 2004/098124    11/2004

OTHER PUBLICATIONS

Fabian Breg and Dennis Gannon, "A customizable implementation of RMI for high performance computing", 1999, Springer Berlin/Heidelberg, vol. 1586/1999, pp. 733-747.*

Campbell, P. and L. Fitzpatrick, "Information Access: A Cornerstone of Web Publishing," <http://archive.ncsa.uiuc.edu/SDG/IT94/Proceedings/WebProd/Griffith/witehtml.html> [retrieved Oct. 6, 2005].

Cherchago, A. and G. Engels, "Preservation of Compatibility Under Evolution of Software Components," University of Paderborn, Germany, <http://w3.umh.ac.be/evol/meetings/chase2005-submissions/Cherchago-Sumission.pdf> [retrieved Oct. 6, 2005].

Nester, Christian; Philippsen, Michael; and Haumacher, Bernard., "A More Efficient RMI for Java", Computer Science Department University of Karlsruhe, Germany <http://wwwipd.ira.uka.de/JavaParty/>pp. 152-159.

"Java Remote Method Invocation Specification", Revision 1.8 Java 2SDK, Standard Edition v1.4, Sun Microsystems, Inc. 2002. pp. 1-120.

"A Customizable Implementation of RMI for High Performance Computing", Proceedings of the 11 IPPS/SPDP '99 Workshops Held in Conjunction with the 13th International Parallel Processing Symposium and 10th Symposium on Parallel and Distributed Processing, vol. 5186, paragraph 3 of p. 4, paragraph 3 of p. 6, paragraph 2-4 of p. 7, figs. 1,5.

* cited by examiner

```
namespace MyNamespace {      ← 304
  public class MyType {
    private int _num;         ← 306
    public int Num {
      get { return _num;}
      set {_num = value;}
    }
    private string _name;     ← 308
    public string Name {
      get { return _name;}
      set {_name = value;}
    }
  }                           ← 302
  public class MyWebService : System.Web.Services.WebService {   ← 310   312
    [WebMethod]
    public MyType MyService(string name) {
314 →  MyType mt = new MyType();
       mt.Name = name;
       return mt;
    }
}
```

MyNamespace.MyWebService =
{ path: "/atlas/BCL/WebService.asmx", MyService:function(name,onMethodComplete, onMethodTimeout) {return Web.Net.ServiceMethodRequest.callMethod(this.path, "MyService",{name:name}, onMethodComplete, onMethodTimeout);},}

MyNamespace.MyType = function() { this.___serverType = "MyNamespace.MyType ";}

402 — (first brace)
404 — (second brace)
406 — (brace around serverType assignment)

Fig. 5.

{"__serverType":"MyNamespace.MyType","Num":5,"Name":"Some String"} — 510

Fig. 6.

{"__serverType":"MyNamespace.MyType","Num":9999,"Name":"New String"} — 612

PRESERVATION OF TYPE INFORMATION BETWEEN A CLIENT AND A SERVER

CROSS-REFERENCE TO RELATED APPLICATION

This application claims the benefit of U.S. Provisional Patent Application No. 60/716,367, filed on Sep. 12, 2005, titled "PRESERVATION OF TYPE INFORMATION BETWEEN A CLIENT AND A SERVER," the disclosure of which is hereby expressly incorporated by reference, and the filing date of which is hereby claimed under 35 U.S.C. §119 (e).

BACKGROUND

In a distributed computing system including a client component ("client") and a server component ("server"), the server may expose a service so that the client can use the exposed service. In a typical scenario, the client calls a method offered by the exposed service on the server. The server executes the method and returns a server object of a specific type to the client. The client may or may not modify the server object sent by the server. The client may also make a new method call using the server object. For example, the client may return the server object to the server as a parameter of the new method call. Similarly, a client may instantiate a client object and send it to the server. Thus, objects may be passed between the server and the client.

Conventionally, an object passed between a client and a server does not include information identifying the type of the object. For example, when the server sends a server object to the client, the server object conventionally does not contain any information that identifies the type of the server object. Thus, later, when the client sends the server object back to the server, the server cannot identify the original type of the server object, e.g., whether the server object was of a string or a Boolean.

While specific disadvantages of existing systems have been illustrated and described in this Background Section, those skilled in the art and others will recognize that the subject matter claimed herein is not limited to any specific implementation for solving any or all of the described disadvantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Aspects of the invention address the above-identified limitations by associating an object passed between a client and a server with metadata identifying the type of the object. As a result, the object can be passed between the client and the server while retaining the type information. Aspects of the invention may also serialize the object so that it is in a data format recognizable by the entity receiving the object.

In accordance with one aspect of the invention, in a distributed computing system including at least one server and at least one client, the client calls services provided by the server. The client understands what services are provided by the server, for example, by examining a proxy class provided by the server. The proxy class identifies what services are provided by the server and includes information on how to call the services. The client calls a server service according to information disclosed in the proxy class.

Upon receiving a call for a server service from the client, the server executes the server service and generates a server object. The server object is attached with information about the type of the server object, and/or one or more properties for the server object and their corresponding types and values. The server then sends the server object and its associated information over to the client. Preferably, before being sent over to the client, the server object and its associated information are serialized into a data format that is understandable by the client.

In accordance with another aspect of the invention, a client can generate client objects. A client object can be instantiated using a type provided by the client or by the proxy class supplied by the server. The client object can also be instantiated based on the type information and property values associated with a server object that the client receives. When a client object is instantiated based on a server object, the client object can use the property values associated with the server object. The client object may also contain property values that are different from those of the server object. The client may send the client object to a server, for example, by calling a server service using the client object as a parameter. Preferably, the client object and its associated information are serialized into a format that can be understood by the server receiving the client object.

In accordance with another aspect of the invention, an object passed between the server and the client may be first serialized into a data format recognized by the object receiver, which can either be the server or the client. Preferably, the serialization of the object is performed by a custom serialization method. The custom serialization method uses a serialization mechanism that provides the data representation scheme of a particular object receiver. The serialization mechanism may be a default serialization mechanism, or a custom serialization mechanism that is tailored for a specific object receiver and that is registered on the server.

In a typical scenario, the custom serialization method uses a client custom serialization mechanism to serialize a server object into a data format recognized by the client. The server then sends the serialized server object to the client. Preferably, the server also sends the client the custom serialization method along with a custom server serialization mechanism. The client can thus use the custom serialization method to serialize a client object into a data format specified in the custom server serialization mechanism. The serialized client object can then be sent to the server in a data format that is recognized by the server.

Sometimes, a serialized object may be formatted, for example, compressed to save network bandwidth, before being sent to the specific object receiver. In such a situation, an aspect of the invention provides a deserialization mechanism that deserializes, for example, by decompressing the serialized object on the object receiver so the object receiver can recognize the data format of the serialized object.

In summary, aspects of the invention associate an object passed between entities in a distributed computing system with metadata identifying the type of the object, and/or values of the properties of the object. Consequently, an object passed between entities in a distributed computing system retains its type information during the transition, thus the entity receiving the object can easily recognize the type of the object. In addition, data format of an object passed between entities may be processed so that the entity receiving the object can understand data in the object.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 is a block diagram illustrating syntax for an exemplary proxy class;

FIG. 5 is a block diagram illustrating syntax for an exemplary object sent to a client by a server;

FIG. 6 is a block diagram illustrating syntax for an exemplary object sent to a server by a client;

DETAILED DESCRIPTION

The following text illustrates and describes exemplary embodiments of the invention. However, those of ordinary skill in the art will appreciate that various changes can be made therein without departing from the spirit and scope of the invention.

Embodiments of the invention may be described in the general context of computer-executable instructions, such as program modules, being executed by a computer including at least a processor and a memory. Generally described, program modules include routines, programs, widgets, objects, components, data structures, and the like that perform particular tasks or implement particular abstract data types. Embodiments of the invention may also be practiced in a distributed computing environment where computing services are provided by some entities ("servers") to other entities ("clients"). The entities may be local to the same computer system or remotely linked through a communication network. In the distributed computing system, program modules providing the services may be located on local and/or remote computer storage media.

Figure 1:
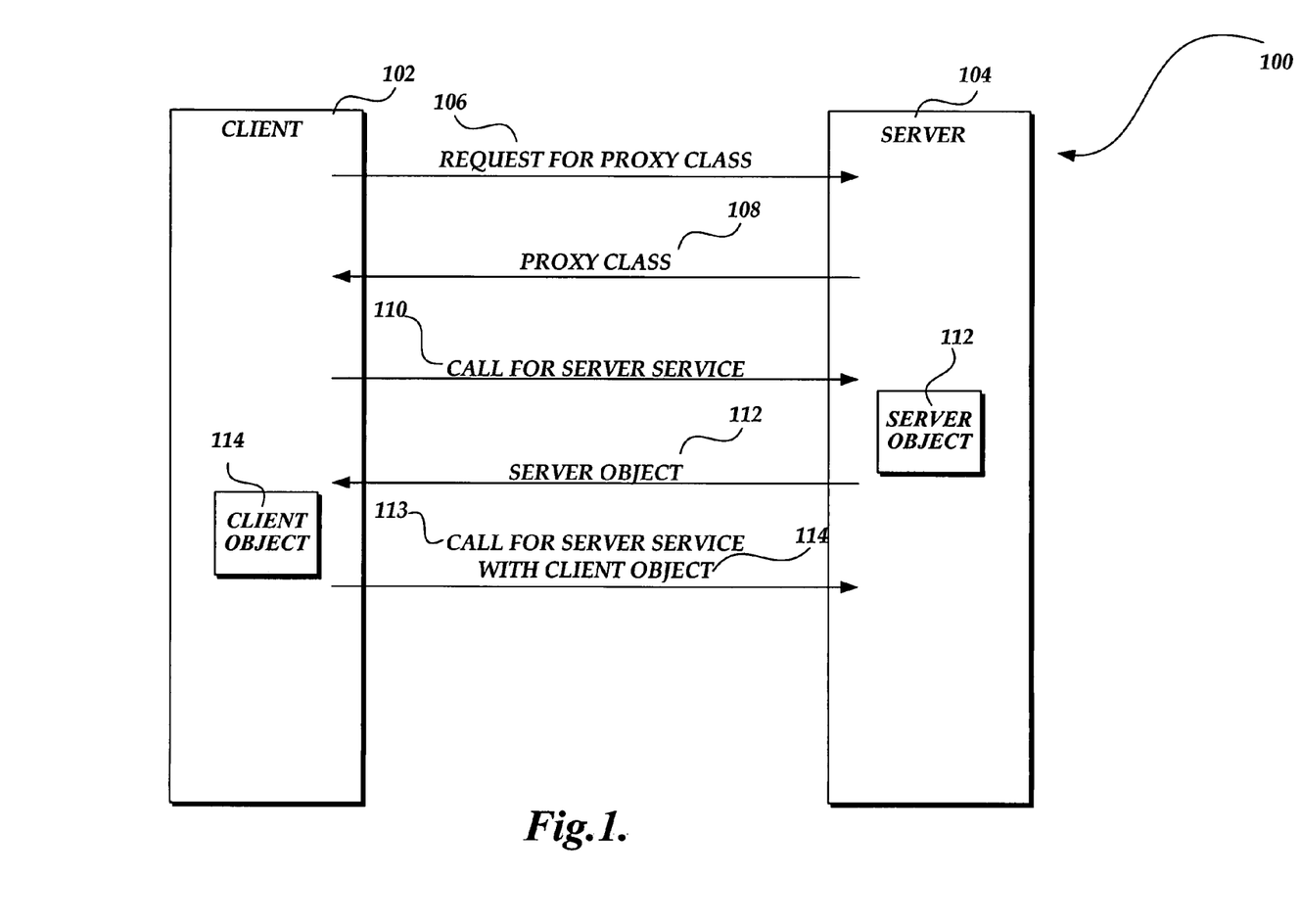
FIG. 1 is a block diagram illustrating exemplary interactions between a client and a server, wherein a server object travels between the client and the server.

FIG. 1 illustrates an exemplary distributed computing system 100 that includes at least one client 102 and at least one server 104. The server 104 provides services such as Web services that the client 102 can use. Exemplary embodiments of the invention use a proxy class 108 to expose a service offered by the server 104. The proxy class 108 may include information about services on the server 104 that are available for the client 102 to use. The proxy class 108 may also provide basic descriptions of the service and information about how to call the service. Typically, the proxy class 108 provides to the client 102 a representation of a service offered by the server 104. For example, the proxy class 108 may include information describing the type of server object.

A link to the proxy class 108 is provided to the client 102, for example, by a developer of the client 102 who knows that the client 102 may need to use a service offered by the server 104. Thus, once the client 102 determines that it needs to use a service offered by the server 104, the client 102 sends a request 106 for the proxy class 108 to the server 104, using the link. The server 104 returns the requested proxy class 108. The client 102 then determines what is offered by the service by examining the proxy class 108. The client 102 thus knows what methods it can call in order to use the service. The client 102 then makes a call 110 for the needed service by using information provided in the proxy class 108. For example, the client 102 may call a specific method offered by the service. Upon receiving the call 110 from the client 102, the server 104 executes the method and returns a server object 112 to the client 102.

In embodiments of the invention, the client 102 may obtain information about services exposed by the server 104 through means other than the proxy class 108. For example, the information about services exposed by the server 104 may have been stored on the client 102 before the client 102 requests one of the services. Alternatively, the client 102 may obtain needed information about a service exposed by the server 104 through a third party, such as an intermediate entity in the distributed computing system 100 hosting the client 102 and the server 104.

Figure 2:
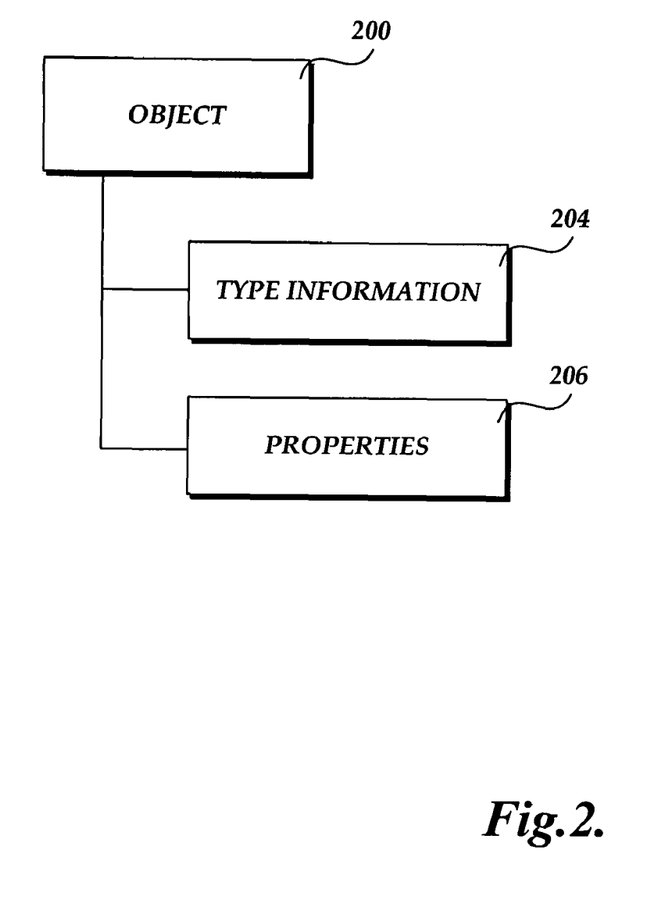
FIG. 2 is a block diagram illustrating an exemplary object passed between a server and a client, wherein the exemplary object is associated with information indicating the type of the object.

As shown in FIG. 2, in embodiments of the invention, an object 200 passed between a client and a server, such as the client 102 and the server 104, includes type information 204 that identifies the specific type of the object. The object 200 may be further associated with one or more properties 206 and their corresponding types and values. In an exemplary embodiment of the invention, each of the one or more properties 206 is an object 200, containing specific type information of the property, one or more properties and their corresponding types and values. The object 200 may be a server object, i.e., an object generated by a server. The object 200 may be a client object, i.e., an object generated by a client.

Returning to FIG. 1, in exemplary embodiments of the invention, upon receiving the server object 112, the client 102 may modify the server object 112. In an exemplary embodiment of the invention, the client 102 modifies the server object 112 by instantiating a new client object 114 using the type information associated with the server object 112. The new client object 114 may include modified or unmodified values of the properties associated with the server object 112. The client 102 may then pass to the server 104 the new client object 114, which has the same type information and properties as the server object 112, though the values of the properties may have been modified. The client 102 may pass the new client object 114 to the server 104, for example, by making a call 113 for a method of the server service using the new client object 114 as a parameter to the method.

In an exemplary embodiment of the invention, the client 102 can also instantiate client objects based on types local to the client 102 or types supplied by the server 104. Information on types supplied by the server 104 may be contained in the proxy class 108, for example. In embodiments of the invention, the actions performed on a server object can also be performed on a client object. For example, the client 102 can associate a client object with information identifying the type and/or the properties of the client object. The client 102 can pass the client object to the server 104; the server 104 may operate on the client object and pass it back to the client 102; and so on.

Figure 3:
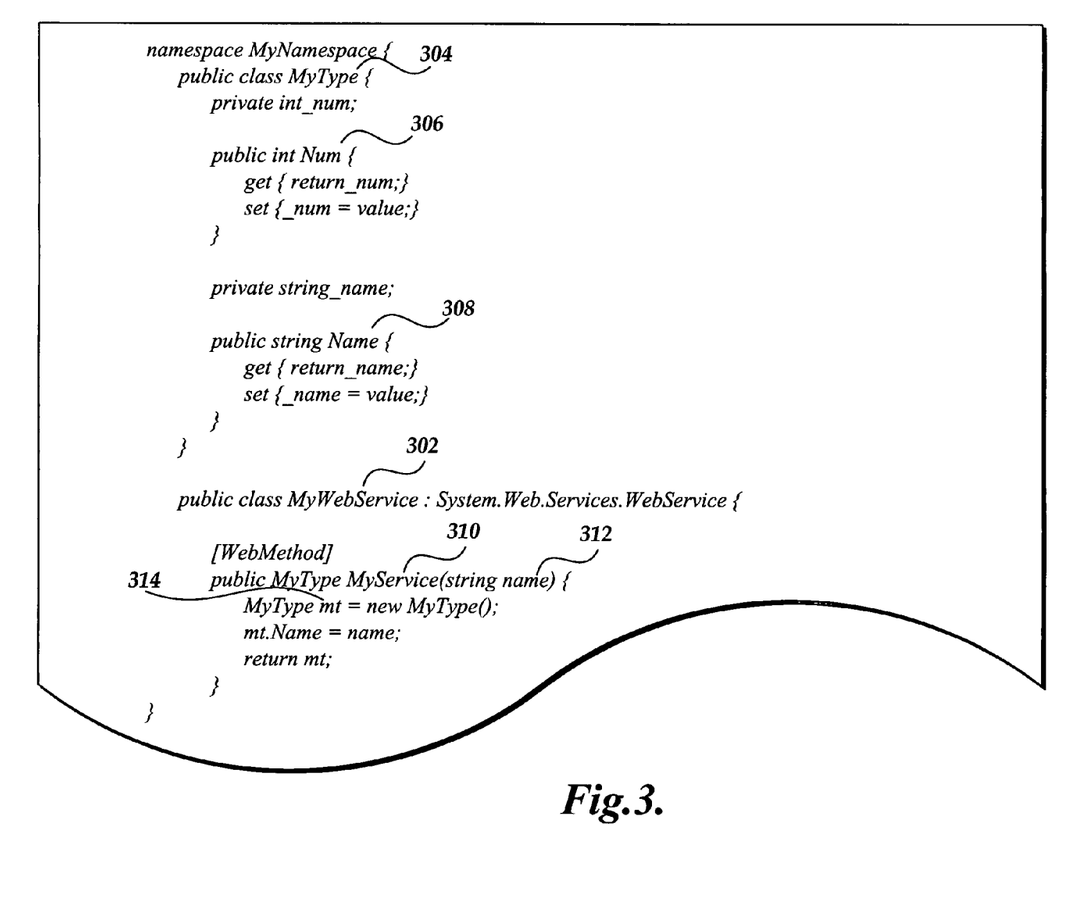
FIG. 3 is a block diagram illustrating an exemplary definition of an exemplary server service returning an object of an exemplary type.

FIG. 3 illustrates an exemplary definition of a service MyWebService 302 and a type MyType 304, which is the type of the server object returned by the MyWebService 302. The MyType 304 has a "Num" 306 property and a "Name" 308 property. As shown by FIG. 3, the MyWebService 302 has a method MyService 310 that takes a parameter "name" 312 and returns an object "mt" 314 of the exemplary type MyType 304.

FIG. 4 illustrates an exemplary proxy class generated by the server 104 for the MyWebService 302 illustrated in FIG. 3. Text 402 illustrates a client-side definition 404 of the exemplary My WebService 302. Text 404 provides a client-side definition of the exemplary MyType 304. In particular, a special token 406 is provided containing the type information associated with the server object. In exemplary embodiments of the invention, when executing the exemplary service MyWebService 302, the server 104 sends the client 102 a server object such as the server object 112 including the special token 406. FIG. 5 illustrates exemplary syntax 510 for an exemplary server object 112 sent to the client 102 after the server 104 executes MyWebService 302. The syntax 510 identifies the special token 406 and the values of properties associated with the server object 112.

In embodiments of the invention, the client 102 may modify the server object 112, for example, by instantiating a new client object 114 using the client-side definition 404 of the exemplary MyType 304. As a result, the new client object 114 has the type specified in the special token 406 and is associated with the properties of the server object 112. The client 102 may also modify the values of the properties in the new client object 114. As illustrated in FIG. 1, the client 102 then sends the new client object 114 as a parameter to a different method back to the server 104. FIG. 6 illustrates exemplary syntax 612 for an exemplary client object 114 that the client 102 may send back to the server 104. The exemplary client object 114 is a modified server object 112. The syntax 612 identifies the special token 406 and the modified property values. In an exemplary embodiment of the invention, upon receiving the exemplary client object 114, the server 104 creates a new server object of the type MyType 304 with the modified property values.

As indicated in the above description, embodiments of the invention allow the client 102 to instantiate new client objects based on type information associated with a server object. The new client object may also be instantiated according to a client type, or a type provided by a server, from example, through the server's proxy class. Typically, type information for a new client object is attached to the new client object in a special token similar in format to the special token 406. Client objects may be sent to the server 104 as parameters for new method calls. Special tokens such as the special token 406 are attached to the new client objects and passed to the server 104 so the server 104 recognizes the types of the new client objects.

Embodiments of the invention may allow only objects of certain types registered on the server 104 to be round-tripped between the client 102 and the server 104. Such restriction limits the objects that can be round-tripped to objects of specific types that the server 104 is willing to expose. The restriction also prevents a malicious client 102 from manufacturing objects that the server 104 is not willing to accept. As a result, the client 102 cannot instantiate objects of arbitrary types to send them back to the server 104.

Embodiments of the invention may also include a custom serialization method that uses serialization mechanisms to change the data format of objects passed between the server 104 and the client 102. Using a serialization mechanism, the custom serialization method changes the representation of an object into a data format that can be recognized by an entity receiving the object ("object receiver"), wherein the object receiver can either be the server 104 or the client 102. Similarly, either the client 102 or the server 104 can be an entity producing and sending an object ("object issuer"). For example, server objects, such as the server object 112, can be serialized into a string that usually can be recognized by a client such as the client 102.

In exemplary embodiment of the invention, the custom serialization method may use a default serialization mechanism, which, in a typical implementation, serializes an object with its original property names. For example, property A of the object will continue to be named as A and property B of the object will continue to be named as B in the serialized object. Alternatively, the custom serialization method may use a custom serialization mechanism to change the data format of an object according to specific requirements of an object receiver. For example, a custom serialization mechanism may change the names of the properties of the objects to suit the data format requirements of an object receiver.

Figure 7:
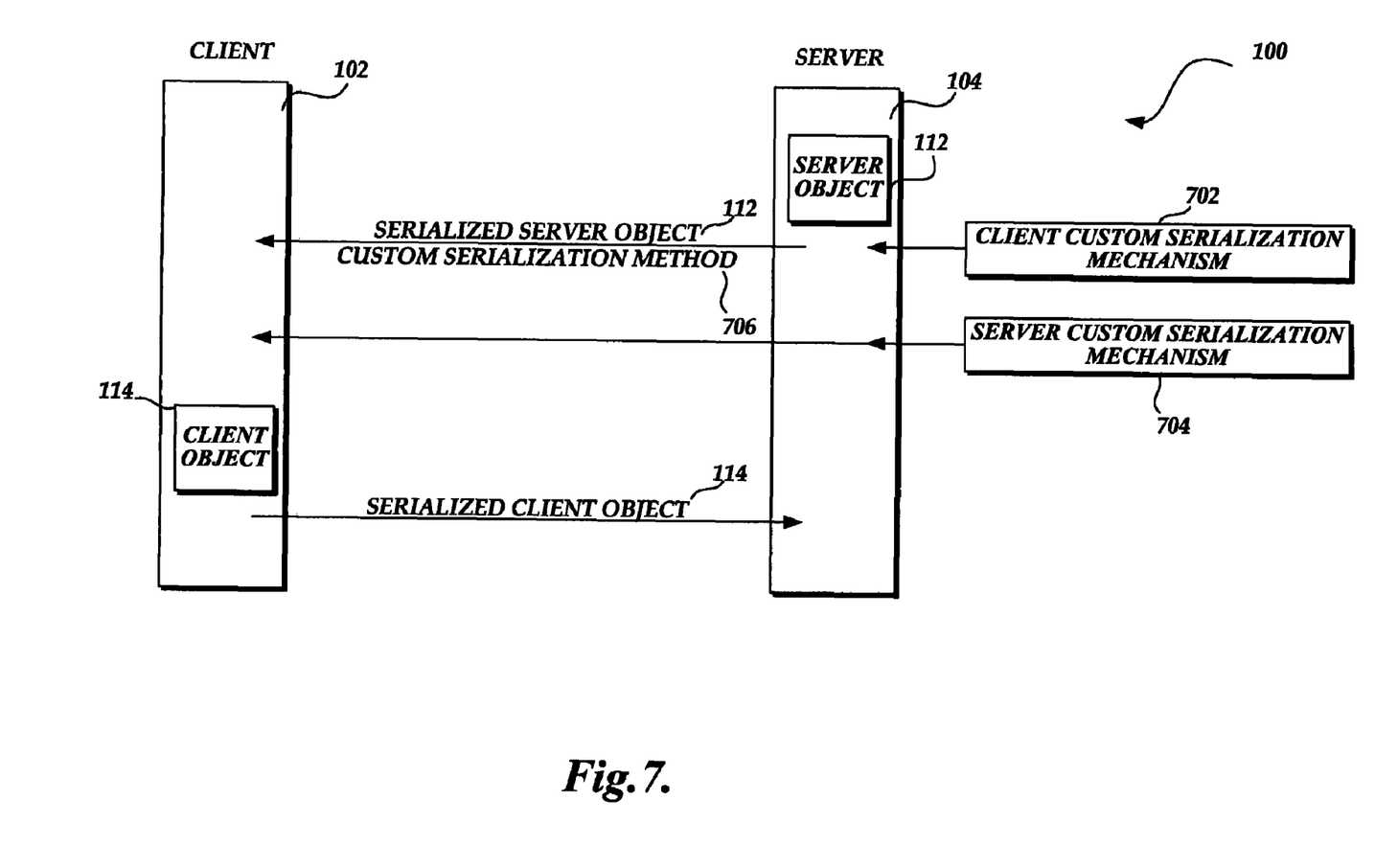
FIG. 7 is a block diagram illustrating an exemplary scenario for serializing an object passed between a server and a client.

FIG. 7 illustrates an exemplary usage scenario of a custom serialization method 706 in the distributed computing system 100 illustrated in FIG. 1. As noted above, both the client 102 and the server 104 in the distributed computing system 100 can generate and/or receive objects. As illustrated, a client custom serialization mechanism 702 may be registered on the server 104. The client custom serialization mechanism 702 identifies at least one data format recognized by the client 102. Similarly, a server custom serialization mechanism 704 may be registered on the server 104. The server custom serialization mechanism 704 identifies at least one data format recognized by the server 104. In an exemplary embodiment of the invention, the custom serialization method 706 uses a default serialization mechanism that resides locally on the client 102 and the server 104 if no custom serialization mechanism is available for the client 102 and/or the server 104.

In embodiments of the invention, at times, a serialized object may be re-formatted before being sent off to an object receiver. For example, the serialized object may be compressed before being sent off in order to save network bandwidth. Thus, in embodiments of the invention, the object receiver may use a deserialization mechanism to deserialize, for example, decompress, a reformatted serialized object. Yet, preferably, a client custom deserialization mechanism may be registered on the server 104 for deserializing a serialized server object on the client, and a server custom deserialization mechanism may be registered on the server 104 for deserializing a serialized client object on the server 104. If no custom deserialization mechanism is available, a default deserialization mechanism is used.

In the usage scenario illustrated in FIG. 7, the custom serialization method 706 uses the client custom serialization mechanism 702 to convert the server object 112 into a data format recognized by the client 102. The server 104 then sends the serialized server object 112 to the client 102. Preferably, the server 104 also sends the custom serialization method 706 to the client 102, along with the server custom serialization mechanism 704 and/or a client custom deserialization mechanism, if one is available. The client 102 may use the received custom serialization method 706 and the client custom deserialization mechanism to deserialize the serialized server object 112 if necessary. Thus, the client 102 can recognize the serialized server object 112.

When the client needs to send the client object 114 to the server 104, the client 102 uses the received custom serialization method 706 and the server custom serialization mechanism 704 to serialize the client object 114 into a data format recognized by the server 104. The client 102 may re-format the serialized client object 114 if necessary, for example, to compress the serialized client object 114 so it uses less network bandwidth. The client 102 then sends the serialized client object 114 to the server 104. Preferably, a server custom deserialization mechanism, if one is registered on the server 104, may be used to deserialize, for example, to decompress, a re-formatted serialized client object into the data format recognized by the server 104

Figure 8:
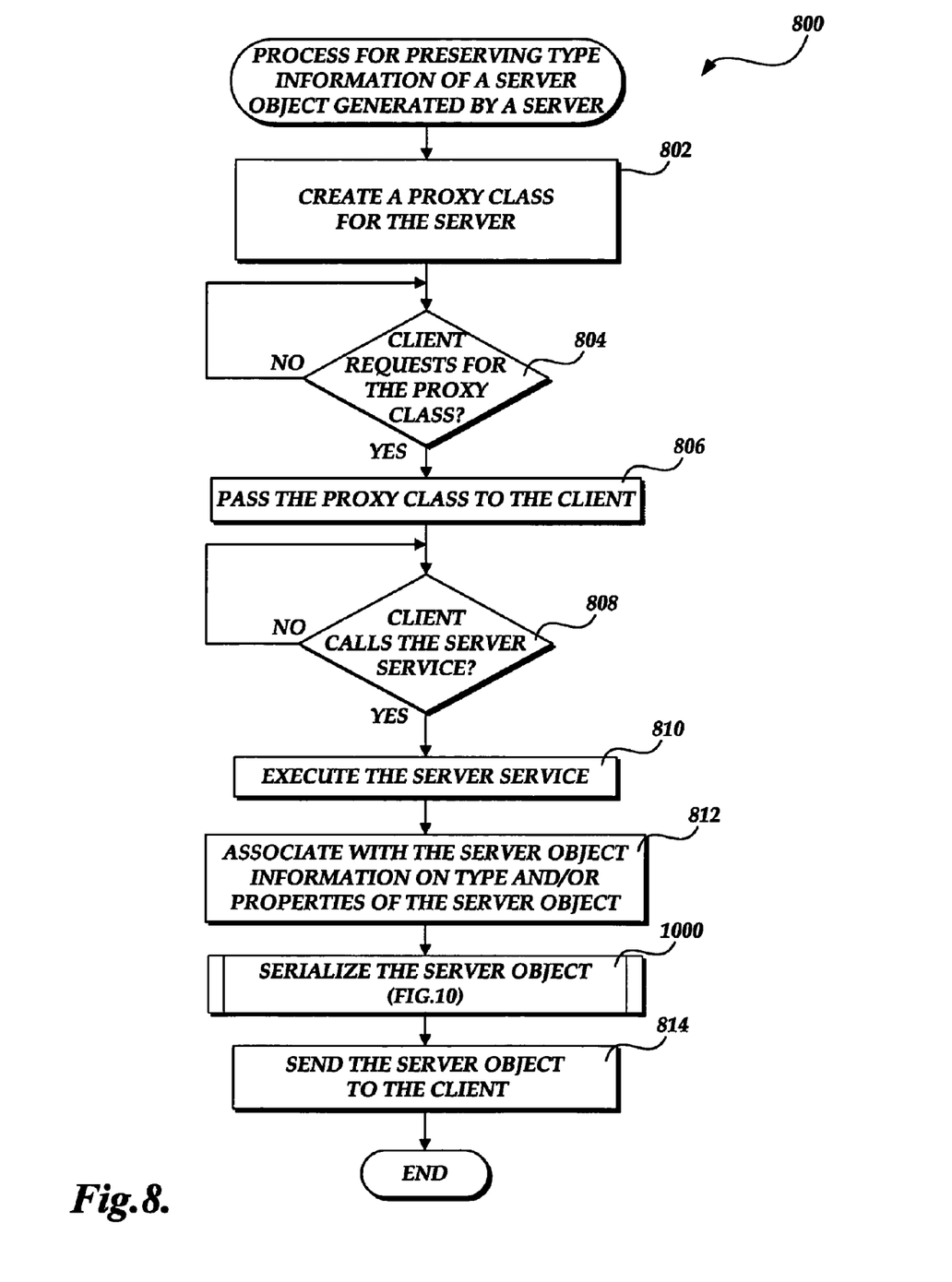
FIG. 8 is a flow diagram illustrating an exemplary process for preserving type information of an object generated by a server.

FIG. 8 illustrates an exemplary process 800 for preserving type information of a server object generated by a server, such as the server 104 illustrated in FIG. 1. In essence, the process 800 generates a server object after executing a server service requested by a client, such as the client 102. The process 800 then associates the server object with the type information and/or any property information of the server object. Preferably, the process 800 serializes the server object, including the associated information. The process 800 then sends the server object and its associated information to the client requesting the server service.

In an exemplary embodiment of the invention, the process 800 starts by creating a proxy class such as the proxy class 108 for the server. See block 802. As described above with reference to FIG. 1, the proxy class may identify all server services provided by the server. The proxy class may also provide a description of a server service and how to call the server service. Preferably, a developer of a client may embed a link to the proxy class in the client upon anticipating that the client may need a service provided by the server. If the client needs a service provided by the server, the client may request the proxy class through the link. Therefore, the process 800 determines whether it receives a request from a client for the proxy class. See decision block 804. If the answer is NO, the process 800 does not proceed further. If the answer is YES, the process 800 proceeds to pass the proxy class to the client. See block 806. Upon receiving the proxy class, the client may examine the proxy class and decide whether to call a server service described in the proxy class. As noted above, the proxy class is one of many means for supplying information about server services to a client. The client may acquire information about exposed services through alternative routes such as from a third party in the distributed computing system hosting the server and the client.

Therefore, the process 800 on the server determines whether it receives a call from the client for a server service. See decision block 808. If the answer to decision block 808 is NO, the process 800 does not proceed further. If the answer to decision block 808 is YES, the process 800 proceeds to execute the server service. See block 810. The execution of the server service produces a server object that is to be passed to the client. In embodiments of the invention, the process 800 associates the service object with information on the type and/or properties of the server object. See block 812. Consequently, the server object becomes an object such as the object 200 illustrated in FIG. 2.

Figure 10:
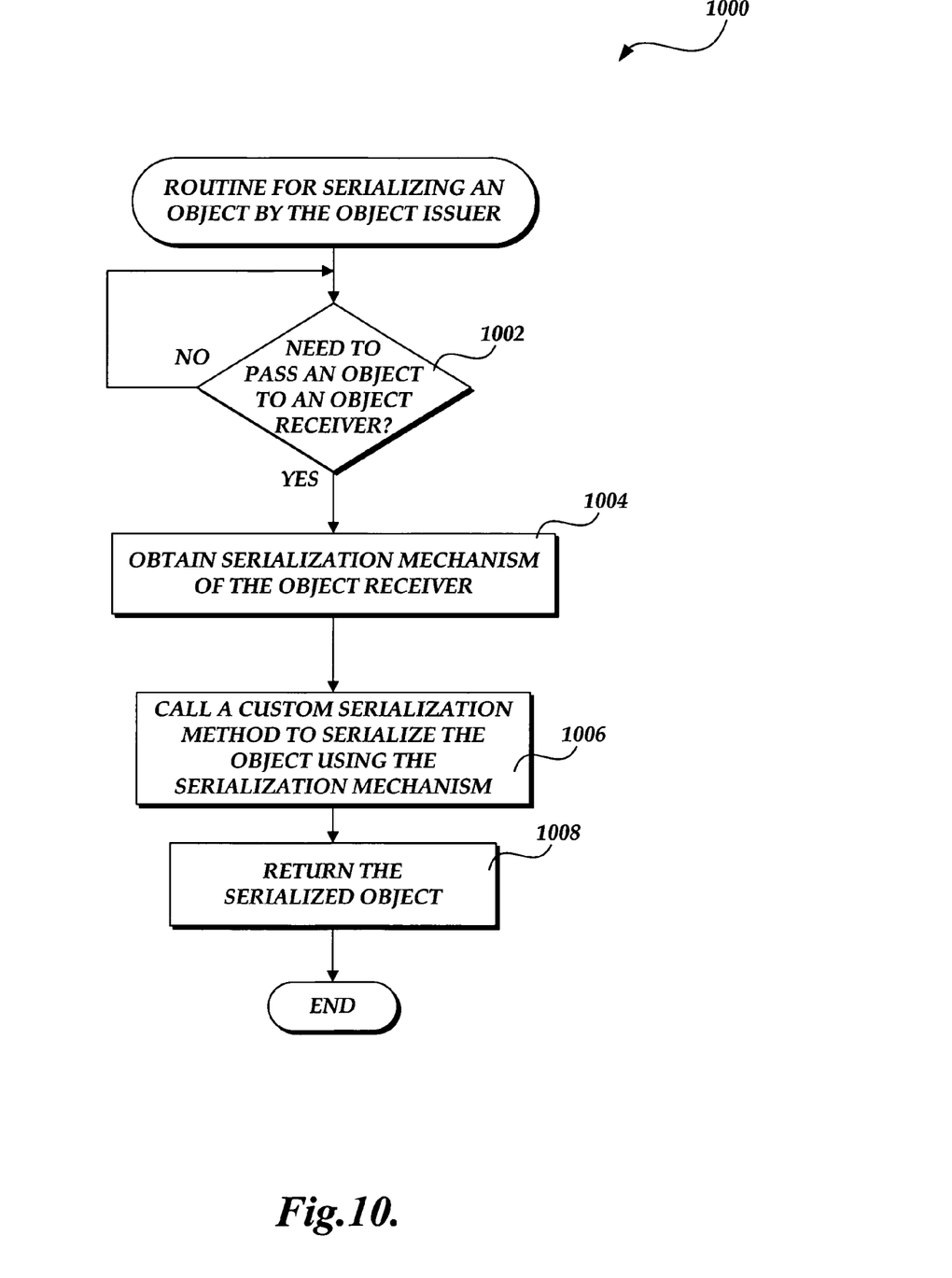
FIG. 10 is a flow diagram illustrating an exemplary routine for serializing an object passed between a server and client, suitable for use in FIGS. 8 and 9.

In some embodiments of the invention, before passing the server object (which includes type information and property information) to the client, the process 800 executes a routine 1000 to serialize the server object. See block 1000. FIG. 10 illustrates an exemplary implementation of the routine 1000 and will be described in detail later. After executing the routine 1000, the server object is serialized into a data format that is recognizable by the client. The process 800 then sends the server object to the client. See block 814. The process 800 then terminates.

Figure 9:
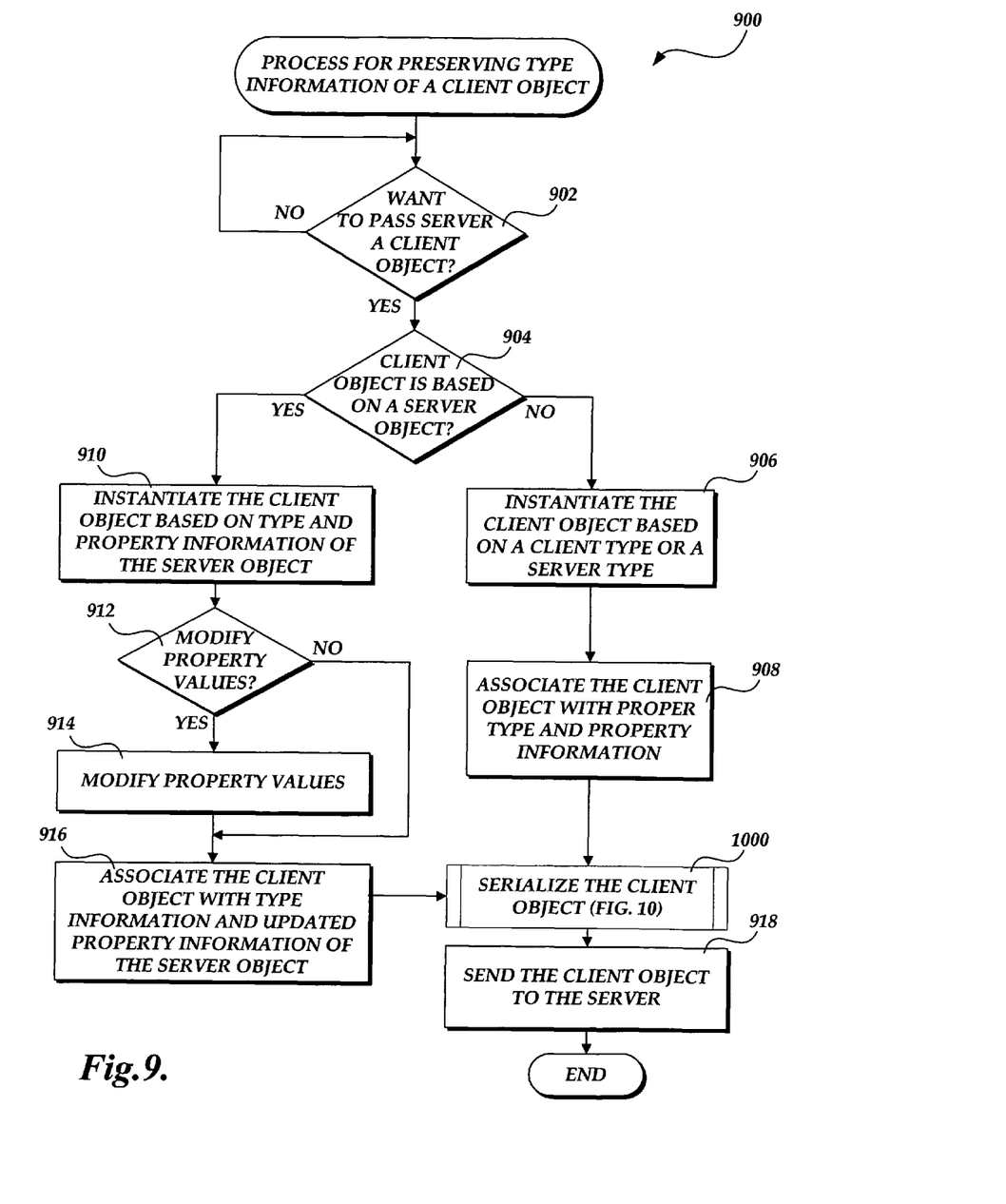
FIG. 9 is a flow diagram illustrating an exemplary process for preserving type information of an object generated by a client.

FIG. 9 illustrates an exemplary process 900 for preserving type information of a client object generated by a client such as the client 102 illustrated in FIG. 1. In essence, the process 900 instantiates a client object based on a type provided by the client or the server or based on the type information associated with a server object, such as the server object 112. If the client object is based on the type information associated with a server object, the property values associated with the server object may be modified before being attached to the client object. The client object may be serialized before being sent to the server as a parameter of a call to a service provided by the server.

In an exemplary embodiment of the invention, as shown in FIG. 9, the process 900 starts by determining whether to send a client object to a server. See decision block 902. If the answer is NO, the process 900 does not proceed further. If the answer to the decision block 902 is YES, the process 900 proceeds to determine whether the client object is to be instantiated based on a server object. See decision block 904. If the answer to decision block 904 is NO, the client object will be instantiated based on a type provided by the client, or by the server—through the proxy class, for example. See block 906. The process 900 then associates the client object with the proper type and property information. See block 908.

If the answer to decision block 904 is YES, meaning the client object is to be instantiated based on a server object, the process 900 instantiates the client object based on the type and property information associated with a server object received from the server. See block 910. In some situations, the property values associated with the server object will be copied directly over to the client object. In other situations, the property values associated with the server object may be modified before being associated with the client object. Therefore, the process 900 determines whether to modify property values associated with the server object. See decision block 912. If the answer is YES, the process 900 proceeds to modify property values of the server object. See block 914. The routine 900 then associates the client object with the type information and the updated property information of the server object. See block 916.

From block 916 or 908, after associating the client object with proper type and property information of the server object, the process 900 may execute the routine 1000 to serialize the client object so it will be in a data format recognized by the server that is to receive the client object. After executing the routine 1000, the process 900 sends the client object to the server, for example, through a call to a server service using the client object as a parameter. See block 918. The routine 900 then terminates.

FIG. 10 illustrates an exemplary implementation of the routine 1000 for serializing an object by an object issuer so that the object can be recognized by the object receiver. The routine 1000 starts by determining whether there is a need to pass an object to an object receiver. See decision block 1002. If the answer is NO, the routine 1000 does not proceed further. If the answer is YES, the routine 1000 obtains the serialization mechanism of the object receiver. See block 1004. As described above with reference to FIG. 7, the serialization mechanism of the object receiver may be a default serialization mechanism or a custom serialization mechanism designed specifically for the object receiver. The routine 1000 then proceeds to call a custom serialization method such as the custom serialization method 706 to serialize the object using the serialization mechanism of the object receiver. See block 1006. The routine 1000 returns the serialized object. See block 1008. The routine 1000 then terminates. In embodiments of the invention, the routine 1000 may re-format the serialized object before returning the serialized object to address specific system needs. For example, the routine 1000 may compress the serialized object so that it will use less network bandwidth when traveling to the object receiver.

Although aspects of the invention have been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The embodiments of the invention in which an exclusive property or privilege is claimed are defined as follows:

1. In a distributed computing system including at least one server component ("server") and at least one client component ("client"), a computer-implemented method for preserving type information of a server object that is passed from the server to the client, comprising:
   receiving a service request from a client computer system, the service request including a request for an indication of those services provided by the server;
   creating a server object including an indication of those services provided by the server, wherein the server object includes a special token that includes one or more portions of specialized syntax in a special token format that identify the type information associated with the server object and one or more values of properties associated with the server object, wherein the special token is included as part of a client-side service definition that defines the parameters and methods of the client-side service;
   associating the server object with at least a portion of type information and at least a portion of property information corresponding to the server object, the property information including one or more property values;
   verifying that the server object is of a specified registered type, wherein only specific object types are allowed to be passed between the server and the client, preventing clients from manufacturing and passing malicious or other arbitrary objects to the server;
   serializing the server object using a custom serialization method that changes the format of the server object according to one or more specified object receiver settings, such that object property names are changed to comply with formats accessible by the object receiver;
   passing each of the following to the client: the verified, serialized server object including the type information and the property information, the custom serialization method, a server custom serialization mechanism and a client custom deserialization mechanism; and
   receiving from the client a modified server object, wherein the client has used both the custom serialization method and the client custom deserialization mechanism to deserialize the serialized server object, and has modified the server object by instantiating a new client object using the same type information and property information as the server object while changing at least one of the property values, and wherein the client passes the newly instantiated client object to the server by making a call for a method of the server service using the new client object as a parameter to the method.

2. The method of claim 1, wherein the server object is further associated with one or more properties and their corresponding types and values.

3. The method of claim 1, wherein the type information of the server object is included in a special token.

4. The method of claim 1, wherein the service request is for a service exposed by the server, and wherein the call induces the server to execute the service to generate the server object.

5. The method of claim 4, wherein information regarding the service is included in a proxy class, which is provided to the client when the client requests the proxy class.

6. The method of claim 5, wherein the proxy class defines the service and the type information associated with the server object.

7. The method of claim 1, further comprising: providing a custom serialization method that serializes the server object, along with any associated information, into a data format that is recognizable by the client.

8. In a distributed computing system including at least one server component ("server") and at least one client component ("client"), wherein the server provides at least one service for the client, a computer-implemented method for preserving type information of a client object passed from the client to the server, comprising:
   sending a service request to the server computer system, the service request including a request for an indication of those services provided by the server;
   creating the client object;
   associating the client object with at least a portion of type information and at least a portion of property information corresponding to the client object, the property information including one or more property values;
   verifying that the client object is of a specified registered type, wherein only specific object types are allowed to be passed between the server and the client, preventing clients from manufacturing and passing malicious or other arbitrary objects to the server;
   serializing the client object using a custom serialization method that changes the format of the client object according to one or more specified object receiver settings, such that object property names are changed to comply with formats accessible by the object receiver;
   sending each of the following to the server: the verified, serialized client object, wherein the client object is associated with the type information and property information of the client object, the custom serialization method, a client custom serialization mechanism and a server custom deserialization mechanism;
   receiving from the server a verified server object that includes type information and the property information; and
   sending a modified server object to the server, wherein the client has used both the custom serialization method and the client custom deserialization mechanism to deserialize the serialized server object, and has modified the server object by instantiating a new client object using the same type information and property information as the server object while changing at least one of the property values, and wherein the client passes the newly instantiated client object to the server by making a call for a method of the server service using the new client object as a parameter to the method, and wherein the server object includes a special token that includes one or more portions of specialized syntax in a special token format that identify the type information associated with the server object and one or more values of properties associated with the server object, wherein the special token is included as part of a client-side service definition that defines the parameters and methods of the client-side service.

9. The method of claim 8, wherein creating the client object includes instantiating the client object with type information of a server object received by the client.

10. The method of claim 9, wherein the server object is associated with one or more properties and their corresponding types and values.

11. The method of claim 10, further comprising: associating the client object with the one or more properties and their corresponding types and values of the server object.

12. The method of claim 11, further comprising: modifying the corresponding values of the one or more properties before associating them with the client object.

13. The method of claim 8, further comprising: serializing the client object and its associated information into a data format that is recognizable by the server.

14. In a distributed computing system including at least one server component ("server") and at least one client component ("client"), a computer-implemented method for serializing an object passed between the server and the client, comprising:
receiving a service request from a client computer system, the service request including a request for an indication of those services provided by the server;
creating a server object including a proxy class configured to provide a description of one or more server services and an indication of how to call the described services, wherein the server object includes a special token that includes one or more portions of specialized syntax in a special token format that identify the type information associated with the server object and one or more values of properties associated with the server object, wherein the special token is included as part of a client-side service definition that defines the parameters and methods of the client-side service;
associating the server object with at least a portion of type information and at least a portion of property information corresponding to the server object, the property information including one or more property values;
serializing the server object that is to be passed to the client, using a custom serialization method that changes the format of the server object according to one or more specified object receiver settings, such that object property names are changed to comply with formats accessible by the object receiver;
verifying that the server object is of a specified registered type, wherein only specific object types are allowed to be passed between the server and the client, preventing clients from manufacturing and passing malicious or other arbitrary objects to the server;
passing each of the following to the client: the verified serialized server object including the type information and the property information, the custom serialization method, a server custom serialization mechanism and a client custom deserialization mechanism;
receiving from the client a modified server object, wherein the client has used both the custom serialization method and the client custom deserialization mechanism to deserialize the serialized server object, and has modified the server object by instantiating a new client object using the same type information and property information as the server object while changing at least one of the property values, and wherein the client passes the newly instantiated client object to the server by making a call for a method of the server service using the new client object as a parameter to the method, the modified server object further including an indication from the client requesting calling a specified service, the client having examined the proxy class to determine which of the server's service methods to call; and
providing the requested service to the client.

15. The method of claim 14, wherein the custom serialization method uses a client custom serialization mechanism identifying the data format recognized by the client.

16. The method of claim 14, further includes: passing the serialized server object to the client, along with the custom serialization method, so that the client can use the custom serialization method to serialize a client object that is to be passed to the server.

17. The method of claim 16, further comprising: passing to the client a server custom serialization mechanism identifying a data format recognized by the server, wherein the custom serialization method will use the server custom serialization mechanism to serialize the client object into the data format recognized by the server.

18. The method of claim 14, wherein the object, after being serialized, is being reformatted before being passed off to a component, the method further comprising:
providing a deserialization mechanism for the component receiving the object to deserialize the serialized object.

19. The method of claim 8, further comprising embedding a link to the proxy class in the client, such that the client can access the proxy class using the link before receiving a proxy class from the server.

20. The method of claim 14, wherein the server object is serialized with the server object's original property names.

* * * * *